Nov. 4, 1947.   A. STERN   2,430,034
APPARATUS FOR LOCATING LEAKS
Filed Aug. 13, 1945
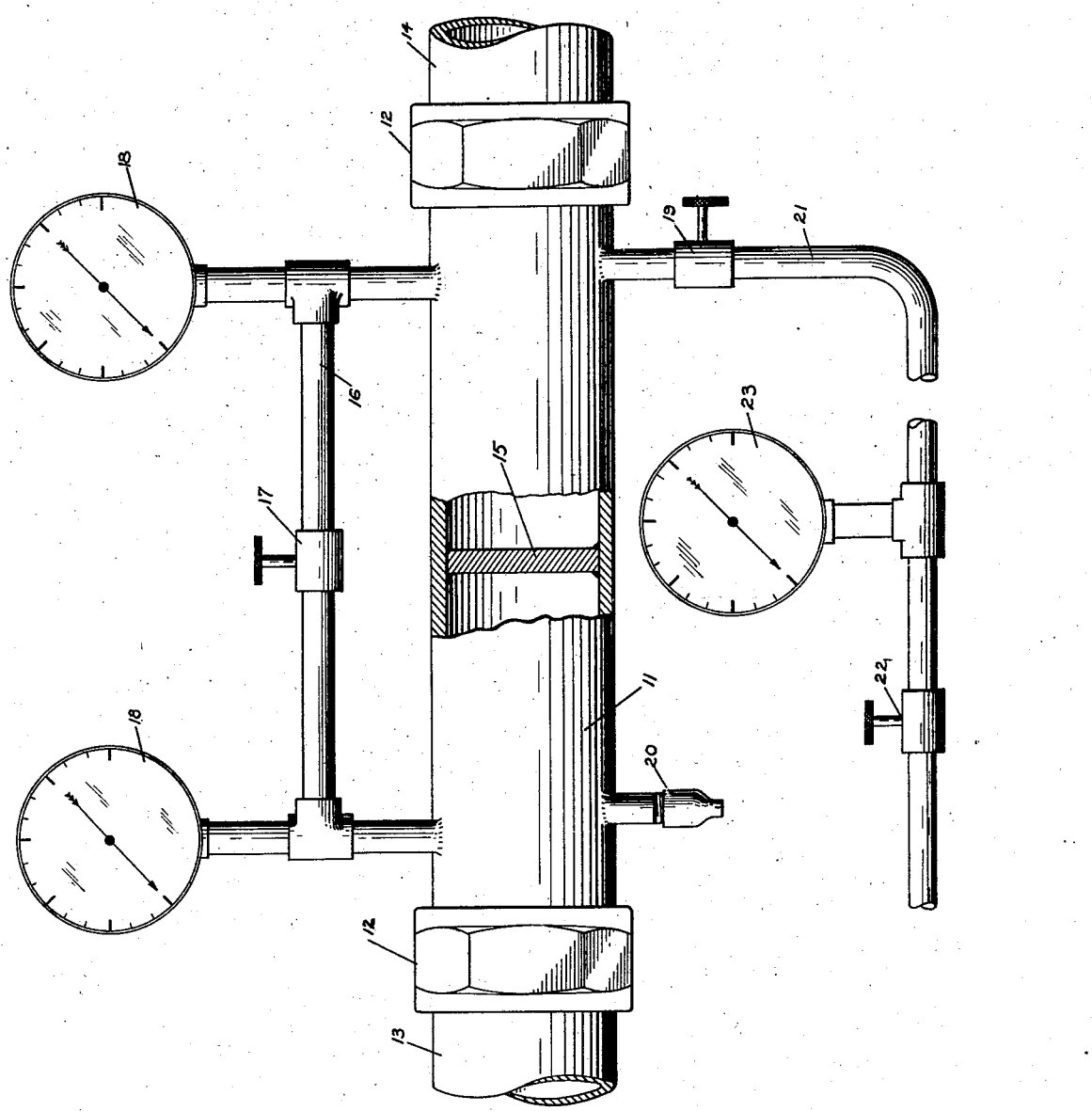
INVENTOR.
ABRAHAM STERN.
BY
ATTORNEY Patented Nov. 4, 1947

2,430,034

UNITED STATES PATENT OFFICE 2,430,034

APPARATUS FOR LOCATING LEAKS

Abraham Stern, New York, N. Y.

Application August 13, 1945, Serial No. 610,657

2 Claims. (Cl. 137—77)

(Granted under the act of March 3, 1883, as amended April 30, 1928; 370 O. G. 757.)

This invention relates to an apparatus for testing pressurized systems to simplify the location of leaks therein.

The apparatus is adaptable to systems for the transmission of fluids under pressure and to systems which are pressurized for any other purpose. Electrical systems including long lengths of coaxial cable, for example, are commonly sealed and pressurized for the purpose of preventing introduction of airborne or other moisture into the coaxial cable, with attendant corrosion difficulties.

Evidence that a pressurized system is leaking is often readily apparent, but location of the leak may be a very extensive project, involving a minute examination of the entire system, parts of which may be extremely difficult of access.

It is an object of this invention to simplify the location of leaks in pressure systems by providing a method for locating the leaks in specific sections of the system.

Another object of this invention is to provide a device easily and quickly insertable into a pressurized system for the purpose of locating leaks in specific sections of the system.

Further objects and advantages of this invention, as well as its construction, arrangement and operation, will be apparent from the following description and claims in connection with the accompanying drawing, in which the single figure is a front elevation, partly broken away, of the device embodying the invention installed in a pressurized system.

A coupling 11, is connected between the near ends of the tubes 13 and 14, which represent parts of a pressurized system. The coupling 11 may replace a standard coupling which happens to be in use in the system, and the coupling 11 is preferably constructed like the couplings used in the system to be tested for leaks. Accordingly, the coupling 11 may be equipped with the nuts 12, one at each end thereof for attaching the coupling to the ends of the tubes 13 and 14, and the nuts 12 can be the same construction as similar nuts used on other couplings in the system. The pressure seals, if any, inside nuts 12, or the means by which the joints between the coupling 11 and the tubes 13 and 14 are pressure-proofed, do not constitute a part of this invention, and are not shown.

A solid plate or wall 15 is welded or otherwise affixed in the interior of coupling 11, so that passage of fluids through the coupling is effectively prevented. A bypass line 16, provided with a valve 17, connects the interior of coupling 11 on one side of wall 15 with the interior of coupling 11 on the other side of wall 15. A pressure gauge 18 is connected into bypass line 16 on either side of valve 17.

Coupling 11 may also be provided with an inlet valve 19 and a bleed valve 20. Inlet line 21 is provided as a convenient means for pressurizing the system, and, if very long, may be provided with a valve 22 at its far end and a pressure gauge 23 between valve 19 and valve 22.

In operation, the device is utilized as follows. A coupling is removed from the system and the device of this invention is inserted in its place. For use with any particular system, a coupling 11 identical with the couplings incorporated in the system is used in constructing the device. With the device in place in the system, inlet valve 19 and bypass valve 17 are opened, and a pressurized fluid is introduced into the entire system. A pressurized gas is preferably used, and in the case of systems pressurized to prevent internal corrosion due to moisture, a pressurized dried gas. The gas may be dried by passing it through any conventional dehydrator, not shown, prior to its introduction into the system.

When the system has been brought up to any desired test pressure, inlet valve 19 and bypass valve 17 are closed. The closing of these valves effects the separation of the system into two distinct sections, separated by wall 15. The pressure in each of the sections is indicated by a pressure gauge 18. After a suitable period of time, inspection of pressure gauges 18 will indicate which of the sections is leaking. If the pressure indicated by one of gauges 18 has fallen, it will be apparent that the section of the system to which that pressure gauge is connected has a leak. If the pressure indicated by one of pressure gauges 18 has remained constant, it will be apparent that the section of the system to which that pressure gauge is connected has no leak, and may be approved as in good condition without further examination. Upon completion of the test, valve 17 may be opened and the system relieved by means of bleed valve 20.

Simplified testing may be provided for in the pressurized system by providing any desired number of couplings in the system, preferably at easily accessible places, so that the system may be separated into any desired number of distinct sections for the purpose of localizing leaks. Where the number of distinct sections connected by couplings is large, the location of leaks may be narrowed down to one or more sections by replacing each of the couplings in the system with the device of this invention, and testing them all simultaneously. Or, alternatively, the device may be inserted into the system at some substantially central location therein, and the leak or leaks narrowed down to one group of sections. The device may then be reinserted in the group of sections containing the leak, and by repeating the process described above the leak may be narrowed down to a part of that group of sections, and the entire procedure continued until each individual section which does not leak has been eliminated.

If inlet line 21 is a permanent part of the system, or is very long, it too may be tested as a separate section of the system by means of valve 22 and pressure gauge 23. With valve 19 and valve 22 closed, pressure gauge 23 will indicate over a period of time the presence or absence of a leak in inlet line 21.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A device for locating leaks in pressurized systems comprising a coupling readily insertable into the system, a solid wall within said coupling preventing passage of fluids therethrough, a bypass line from the interior of said coupling on one side of said wall to the interior of said coupling on the other side of said wall, a valve in said bypass line, and a pressure gauge in said bypass line on either side of said bypass valve.

2. A device for locating leaks in pressurized systems comprising a coupling readily insertable into the system, a solid wall within said coupling preventing passage of fluids therethrough, a pressure line leading to said coupling, a bypass line from the interior of said coupling on one side of said wall to the interior of said coupling on the other side of said wall, a valve in said bypass line, a pressure gauge in said bypass line on either side of said bypass valve, a valve at either end of said pressure line leading to said coupling, a pressure gauge in said pressure line between said pressure line valves, and a bleed valve in said coupling.

ABRAHAM STERN.

REFERENCES CITED

The following references are of record in the file of this patent:

UNITED STATES PATENTS

| Number | Name | Date |
|---|---|---|
| 1,906,636 | Schlecker | May 2, 1933 |
| 1,975,075 | Bennett | Oct. 2, 1934 |
| 2,071,698 | Mample | Feb. 23, 1937 |
| 1,959,863 | Griss | May 22, 1934 |